(12) United States Patent
Manolakos et al.

(10) Patent No.: US 11,582,126 B2
(45) Date of Patent: *Feb. 14, 2023

(54) DELAY SPREAD AND AVERAGE DELAY QUASI-COLLOCATION SOURCES FOR POSITIONING REFERENCE SIGNALS

(71) Applicant: QUALCOMM Incorporated, San Diego, CA (US)

(72) Inventors: Alexandros Manolakos, Escondido, CA (US); Sony Akkarakaran, Poway, CA (US); Guttorm Ringstad Opshaug, Redwood City, CA (US); Joseph Binamira Soriaga, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/192,594

(22) Filed: Mar. 4, 2021

(65) Prior Publication Data

US 2021/0194784 A1   Jun. 24, 2021

Related U.S. Application Data

(63) Continuation of application No. 16/581,141, filed on Sep. 24, 2019, now Pat. No. 10,944,659.

(30) Foreign Application Priority Data

Oct. 5, 2018 (GR) ............................... 20180100462

(51) Int. Cl.
*H04L 43/0852* (2022.01)
*H04L 5/00* (2006.01)
(Continued)

(52) U.S. Cl.
CPC ...... *H04L 43/0852* (2013.01); *G01S 5/02213* (2020.05); *G01S 5/06* (2013.01);
(Continued)

(58) Field of Classification Search
None
See application file for complete search history.

(56) References Cited

U.S. PATENT DOCUMENTS 9,037,155 B2   5/2015  Fischer et al.
10,944,659 B2 *  3/2021  Manolakos ........... H04L 27/261
(Continued)

OTHER PUBLICATIONS

International Search Report and Written Opinion—PCT/US2019/052970—ISA/EPO—dated Jan. 8, 2020.

*Primary Examiner* — Anh Ngoc M Nguyen
(74) *Attorney, Agent, or Firm* — Qualcomm Incorporated

(57) ABSTRACT

Disclosed are techniques for receiving reference radio frequency (RF) signals for positioning estimation. In an aspect, a receiver device receives, from a transmission point, a reference RF signal on a wireless channel receives, from a positioning entity, an indication that the reference RF signal serves as a source for a quasi-collocation (QCL) type(s) for positioning reference RF signals received by the receiver device from the transmission point on the wireless channel, measures an average delay, a delay spread, or both the average delay and the delay spread of the reference RF signal based on the QCL type(s), receives, from the transmission point, a positioning reference RF signal on the wireless channel, and identifies a time of arrival (ToA) of the positioning reference RF signal based on the measured average delay, the delay spread, or both the average delay and the delay spread of the reference RF signal.

30 Claims, 12 Drawing Sheets

(51) Int. Cl.
  *G01S 5/06* (2006.01)
  *G01S 5/02* (2010.01)
(52) U.S. Cl.
  CPC .......... *H04L 5/0005* (2013.01); *H04L 5/0051* (2013.01); *H04L 5/0094* (2013.01)

(56) References Cited

U.S. PATENT DOCUMENTS

| | | | |
|---|---|---|---|
| 2015/0349940 A1* | 12/2015 | Kim | H04L 5/005 370/329 |
| 2015/0365154 A1* | 12/2015 | Davydov | H04B 7/0632 370/329 |
| 2015/0382318 A1 | 12/2015 | Kim et al. | |
| 2016/0249279 A1 | 8/2016 | Koorapaty et al. | |
| 2017/0289831 A1 | 10/2017 | Park et al. | |
| 2019/0052443 A1* | 2/2019 | Cheng | H04L 5/0007 |
| 2019/0327717 A1* | 10/2019 | Li | H04W 72/042 |
| 2019/0356364 A1* | 11/2019 | Maamari | H04W 72/082 |
| 2020/0112498 A1 | 4/2020 | Manolakos et al. | |
| 2020/0154299 A1* | 5/2020 | Shi | H04L 5/0057 |

\* cited by examiner

DELAY SPREAD AND AVERAGE DELAY QUASI-COLLOCATION SOURCES FOR POSITIONING REFERENCE SIGNALS

CROSS-REFERENCE TO RELATED APPLICATIONS

The present Application for Patent is a continuation of U.S. patent application Ser. No. 16/581,141, entitled "DELAY SPREAD AND AVERAGE DELAY QUASI-COLLOCATION SOURCES FOR POSITIONING REFERENCE SIGNALS," filed Sep. 24, 2019, which claims priority under 35 U.S.C. § 119 to Greek Patent Application No. 20180100462, entitled "DELAY SPREAD AND AVERAGE DELAY QUASI-COLLOCATION SOURCES FOR POSITIONING REFERENCE SIGNALS," filed Oct. 5, 2018, each assigned to the assignee hereof, and expressly incorporated herein by reference in its entirety.

TECHNICAL FIELD

Various aspects described herein generally relate to wireless communication systems, and more particularly, to delay spread and average delay quasi-collocation sources for positioning reference signals.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

To support position estimations in terrestrial wireless networks, a mobile device can be configured to measure and report the observed time difference of arrival (OTDOA) or reference signal timing difference (RSTD) between reference radio frequency (RF) signals received from two or more network nodes (e.g., different base stations or different transmission points (e.g., antennas) belonging to the same base station).

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for receiving reference RF signals for positioning estimation includes receiving, at a receiver device from a transmission point, a reference RF signal on a wireless channel; receiving, at the receiver device from a positioning entity, an indication that the reference RF signal serves as a source for a quasi-collocation (QCL) type(s) for positioning reference RF signals received by the receiver device from the transmission point on the wireless channel; measuring, by the receiver device, an average delay, a delay spread, or both the average delay and the delay spread of the source reference RF signal based on the QCL type(s); receiving, at the receiver device from the transmission point, a positioning reference RF signal on the wireless channel; and identifying, by the receiver device, a time of arrival (ToA) of the positioning reference RF signal based on the measured average delay, the delay spread, or both of the reference RF signal.

In an aspect, a method of wireless communication performed by a transmission point includes transmitting, to a receiver device, a reference RF signal on a wireless channel; transmitting, to the receiver device, an indication that the reference RF signal serves as a source for a QCL type(s) for positioning reference RF signals received by the receiver device from the transmission point on the wireless channel; and transmitting, to the receiver device, a positioning reference RF signal on the wireless channel according to the QCL type(s), wherein the QCL type(s) indicates that the reference RF signal and the positioning reference RF signal have the same average delay only, the same delay spread only, or both the same average delay and the same delay spread.

In an aspect, an apparatus for wireless communication includes at least one receiver of a receiver device configured to: receive, from a transmission point, a reference RF signal on a wireless channel; and receive, from a positioning entity, an indication that the reference RF signal serves as a source for a QCL type(s) for positioning reference RF signals received by the receiver device from the transmission point on the wireless channel; and at least one processor of the receiver device configured to: measure an average delay, a delay spread, or both the average delay and the delay spread of the source reference RF signal based on the QCL type(s), wherein the at least one receiver is further configured to receive, from the transmission point, a positioning reference RF signal on the wireless channel, and wherein the at least one processor is further configured to identify a ToA of the positioning reference RF signal based on the measured average delay, the delay spread, or both the average delay and the delay spread of the reference RF signal.

In an aspect, an apparatus for wireless communication includes a transmitter of a transmission point configured to: transmit, to a receiver device, a reference RF signal on a wireless channel; transmit, to the receiver device, an indication that the reference RF signal serves as a source for a QCL type(s) for positioning reference RF signals received by the receiver device from the transmission point on the wireless channel; and transmit, to the receiver device, a positioning reference RF signal on the wireless channel according to the QCL type(s), wherein the QCL type(s) indicates that the reference RF signal and the positioning reference RF signal have the same average delay only, the same delay spread only, or both the same average delay and the same delay spread.

In an aspect, an apparatus for wireless communication includes means for receiving, at a receiver device from a transmission point, a reference RF signal on a wireless channel; means for receiving, at the receiver device from a positioning entity, an indication that the reference RF signal serves as a source for a QCL type(s) for positioning reference RF signals received by the receiver device from the transmission point on the wireless channel; means for measuring, by the receiver device, an average delay, a delay spread, or both the average delay and the delay spread of the reference RF signal based on the QCL type(s); means for receiving, at the receiver device from the transmission point, a positioning reference RF signal on the wireless channel; and means for identifying, by the receiver device, a ToA of the positioning reference RF signal based on the measured average delay, the delay spread, or both the average delay and the delay spread of the reference RF signal.

In an aspect, an apparatus for wireless communication includes means for transmitting, to a receiver device, a reference RF signal on a wireless channel; means for transmitting, to the receiver device, an indication that the reference RF signal serves as a source for a QCL type(s) for positioning reference RF signals received by the receiver device from the transmission point on the wireless channel; and means for transmitting, to the receiver device, a positioning reference RF signal on the wireless channel according to the QCL type(s), wherein the QCL type(s) indicates that the reference RF signal and the positioning reference RF signal have the same average delay only, the same delay spread only, or both the same average delay and the same delay spread.

In an aspect, a non-transitory computer-readable medium storing computer-executable instructions for wireless communication includes computer-executable instructions comprising: at least one instruction instructing a receiver device to receive, from a transmission point, a reference RF signal on a wireless channel; at least one instruction instructing the receiver device to receive, from a positioning entity, an indication that the reference RF signal serves as a source for a QCL type(s) for positioning reference RF signals received by the receiver device from the transmission point on the wireless channel; at least one instruction instructing the receiver device to measure an average delay, a delay spread, or both the average delay and the delay spread of the reference RF signal based on the QCL type(s); at least one instruction instructing the receiver device to receive, from the transmission point, a positioning reference RF signal on the wireless channel; and at least one instruction instructing the receiver device to identify a ToA of the positioning reference RF signal based on the measured average delay, the delay spread, or both the average delay and the delay spread of the reference RF signal.

In an aspect, a non-transitory computer-readable medium storing computer-executable instructions for wireless communication includes computer-executable instructions comprising: transmitting, to a receiver device, a reference RF signal on a wireless channel; transmitting, to the receiver device, an indication that the reference RF signal serves as a source for a QCL type(s) for positioning reference RF signals received by the receiver device from the transmission point on the wireless channel; and transmitting, to the receiver device, a positioning reference RF signal on the wireless channel according to the QCL type(s), wherein the QCL type(s) indicates that the reference RF signal and the positioning reference RF signal have the same average delay only, the same delay spread only, or both the same average delay and the same delay spread.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
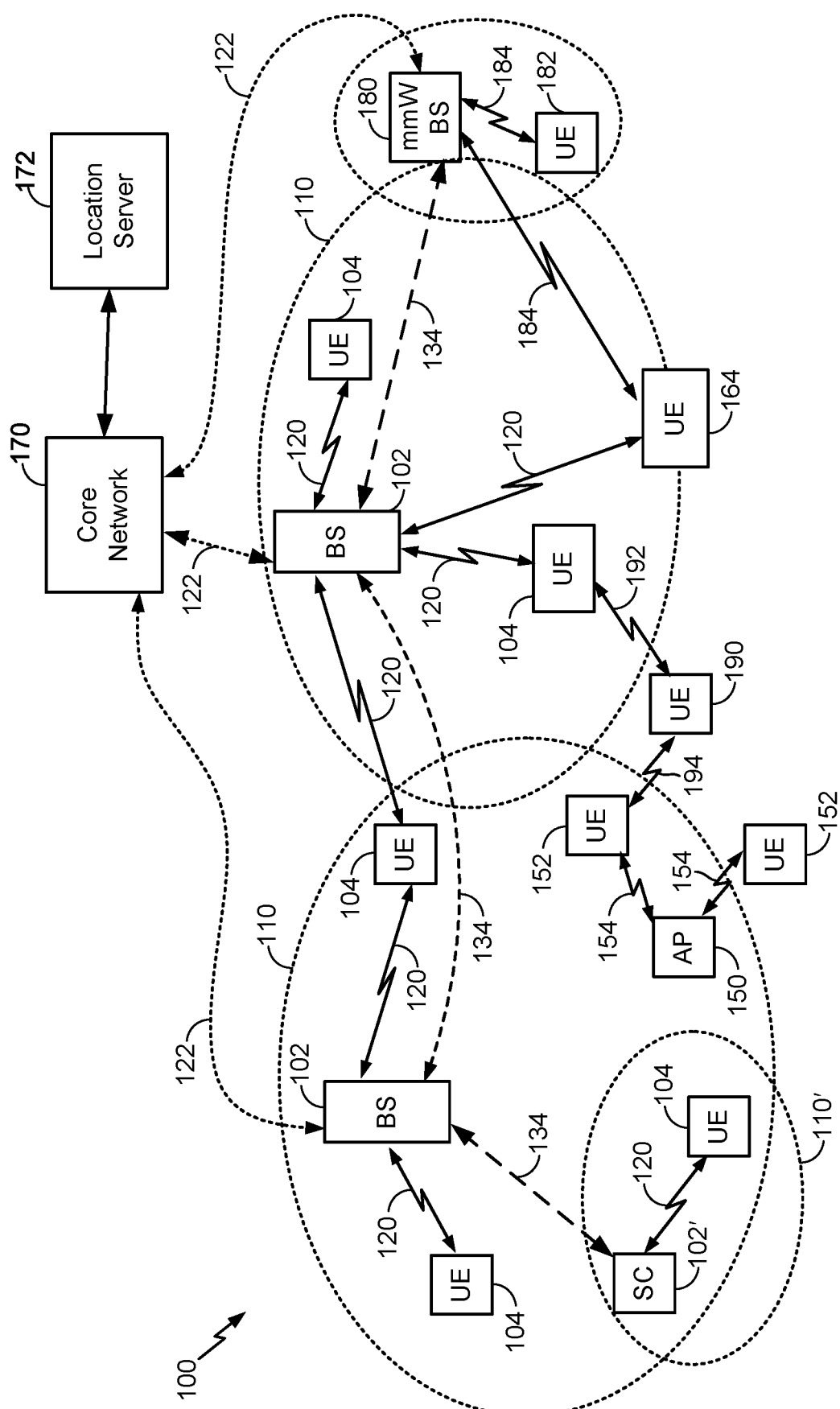
FIG. 1 illustrates an exemplary wireless communications system, according to aspects of the disclosure.

Various aspects described herein generally relate to wireless communication systems, and more particularly, to delay spread and average delay quasi-collocation sources for positioning reference signals in 5G NR and associated transmission parameters. These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

An "RF signal" comprises an electromagnetic wave that transports information through the space between a transmitter (e.g., base station 102) and a receiver (e.g., UE 104). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. An RF signal may also be referred to herein as simply a "signal."

Reference RF signals, such as positioning reference signals (PRS) and navigation reference signals (NRS), may be transmitted on multiple resource elements (REs) of a slot (e.g., 0.5 ms) of a subframe (e.g., 1 ms) of a radio frame (e.g., 10 ms). An RE is a time-frequency resource of one subcarrier (also referred to as a "tone") in the frequency domain and one orthogonal frequency division multiplexing (OFDM) symbol in the time domain. A slot may be divided into, for example, seven OFDM symbols in the time domain. An OFDM symbol/slot/subframe/frame may be divided into, for example, 12 subcarriers, or tones, in the frequency domain. If a reference RF signal is transmitted on each tone of an OFDM symbol, it is referred to as comb-1, and if it is transmitted on every fourth tone of an OFDM symbol, it is referred to as comb-4.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
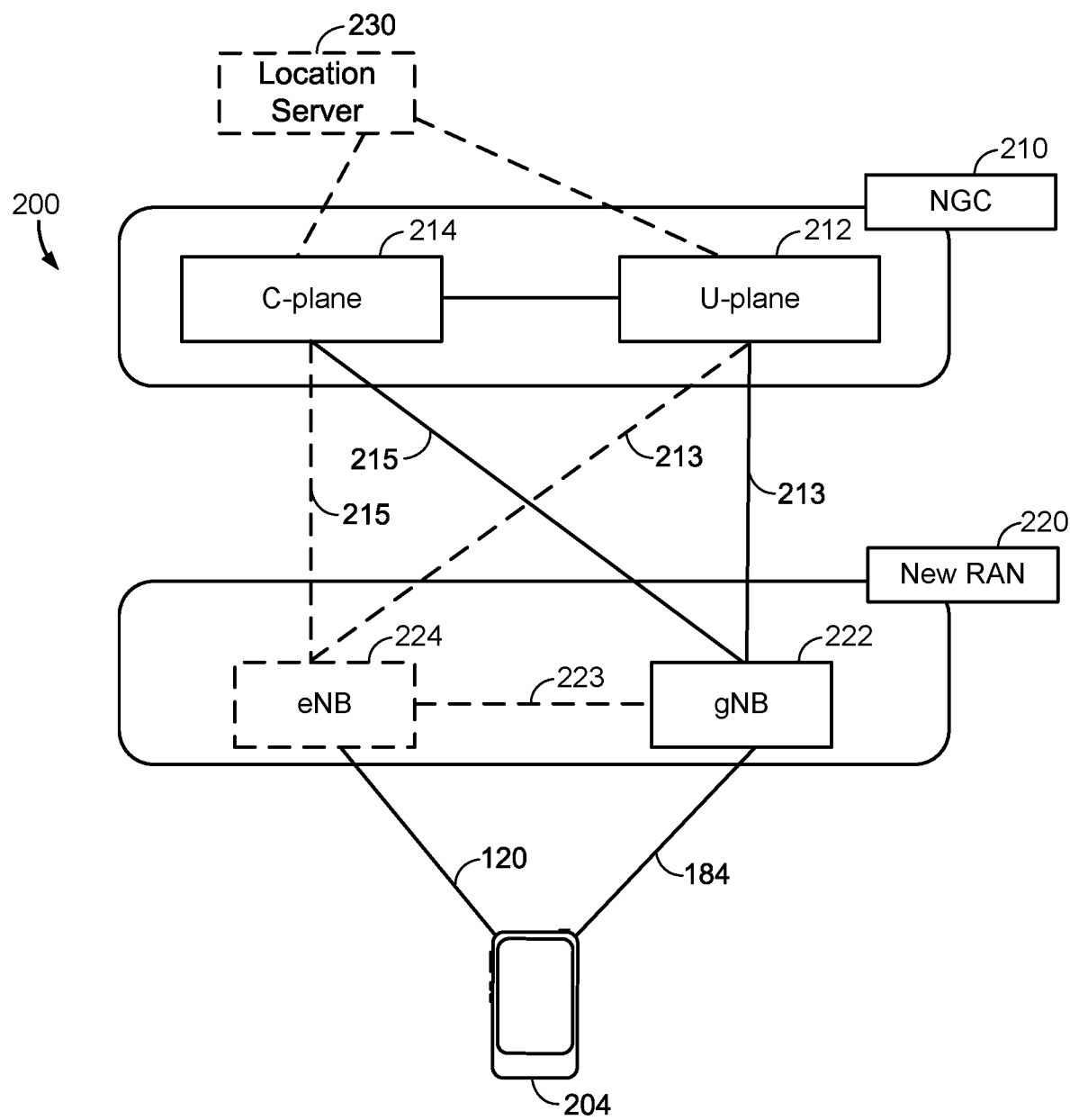
FIGS. 2A and 2B illustrate example wireless network structures, according to aspects of the disclosure.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230 (which may correspond to location server 172), which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
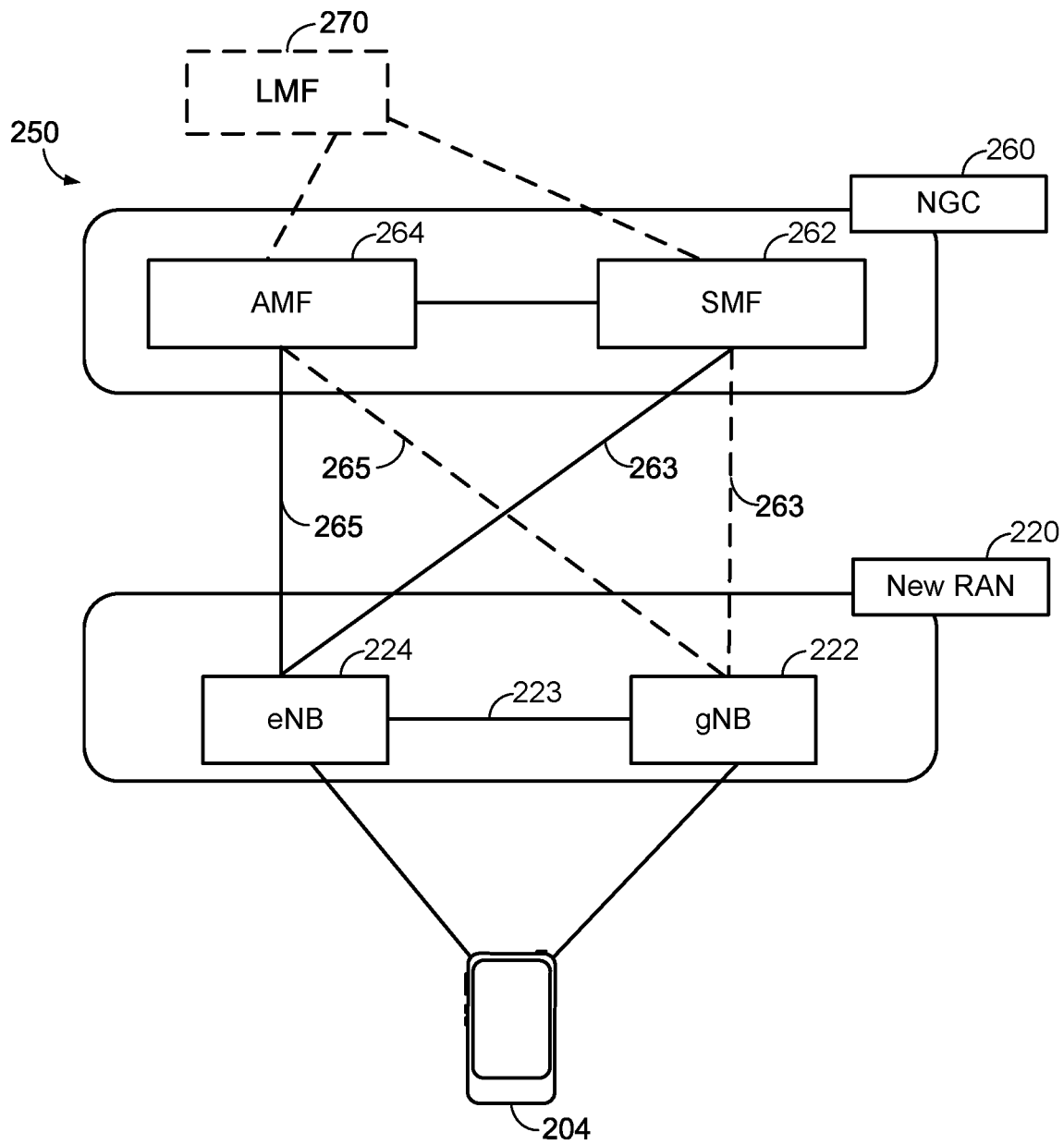

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
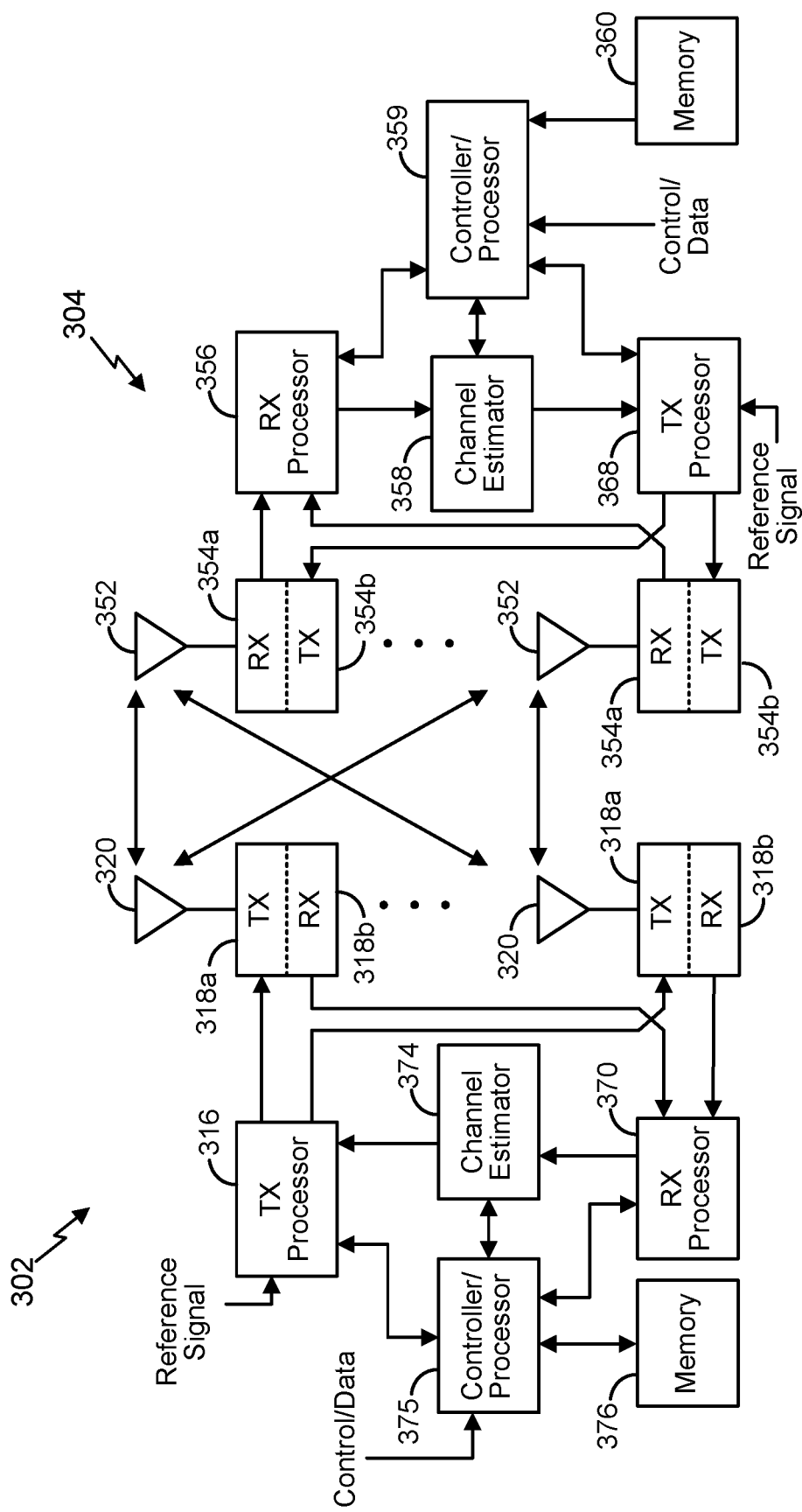
FIG. 3 illustrates an exemplary base station and an exemplary UE in an access network, according to aspects of the disclosure.

According to various aspects, FIG. 3 illustrates an exemplary base station 302 (e.g., an eNB, a gNB, a small cell AP, a WLAN AP, etc.) in communication with an exemplary UE 304 in a wireless network, according to aspects of the disclosure. The base station 302 may correspond to any of the base stations described herein. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference RF signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference RF signal and/or channel condition feedback transmitted by the UE 304. Each spatial stream may then be provided to one or more different antennas 320 via a separate transmitter 318a. Each transmitter 318a may modulate an RF carrier with a respective spatial stream for transmission.

At the UE 304 (which may correspond to any of the UEs described herein), each receiver 354a receives a signal through its respective antenna 352. Each receiver 354a recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 304. If multiple spatial streams are destined for the UE 304, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference RF signal, are recovered and demodulated by determining the most likely signal constellation points transmitted by the base station 302. These soft decisions may be based on channel estimates computed by the channel estimator 358. The soft decisions are then decoded and de-interleaved to recover the data and control signals that were originally transmitted by the base station 302 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 302, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator 358 from a reference RF signal or feedback transmitted by the base station 302 may be used by the TX processor 368 to select the appropriate coding and modulation schemes, and to facilitate spatial processing. The spatial streams generated by the TX processor 368 may be provided to different antenna 352 via separate transmitters 354b. Each transmitter 354b may modulate an RF carrier with a respective spatial stream for transmission. In an aspect, the transmitters 354b and the receivers 354a may be one or more transceivers, one or more discrete transmitters, one or more discrete receivers, or any combination thereof.

The UL transmission is processed at the base station 302 in a manner similar to that described in connection with the receiver function at the UE 304. Each receiver 318b receives a signal through its respective antenna 320. Each receiver 318b recovers information modulated onto an RF carrier and provides the information to a RX processor 370. In an aspect, the transmitters 318a and the receivers 318b may be one or more transceivers, one or more discrete transmitters, one or more discrete receivers, or any combination thereof.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 304. IP packets from the controller/processor 375 may be provided to the core network. The controller/processor 375 is also responsible for error detection.

Figure 4:
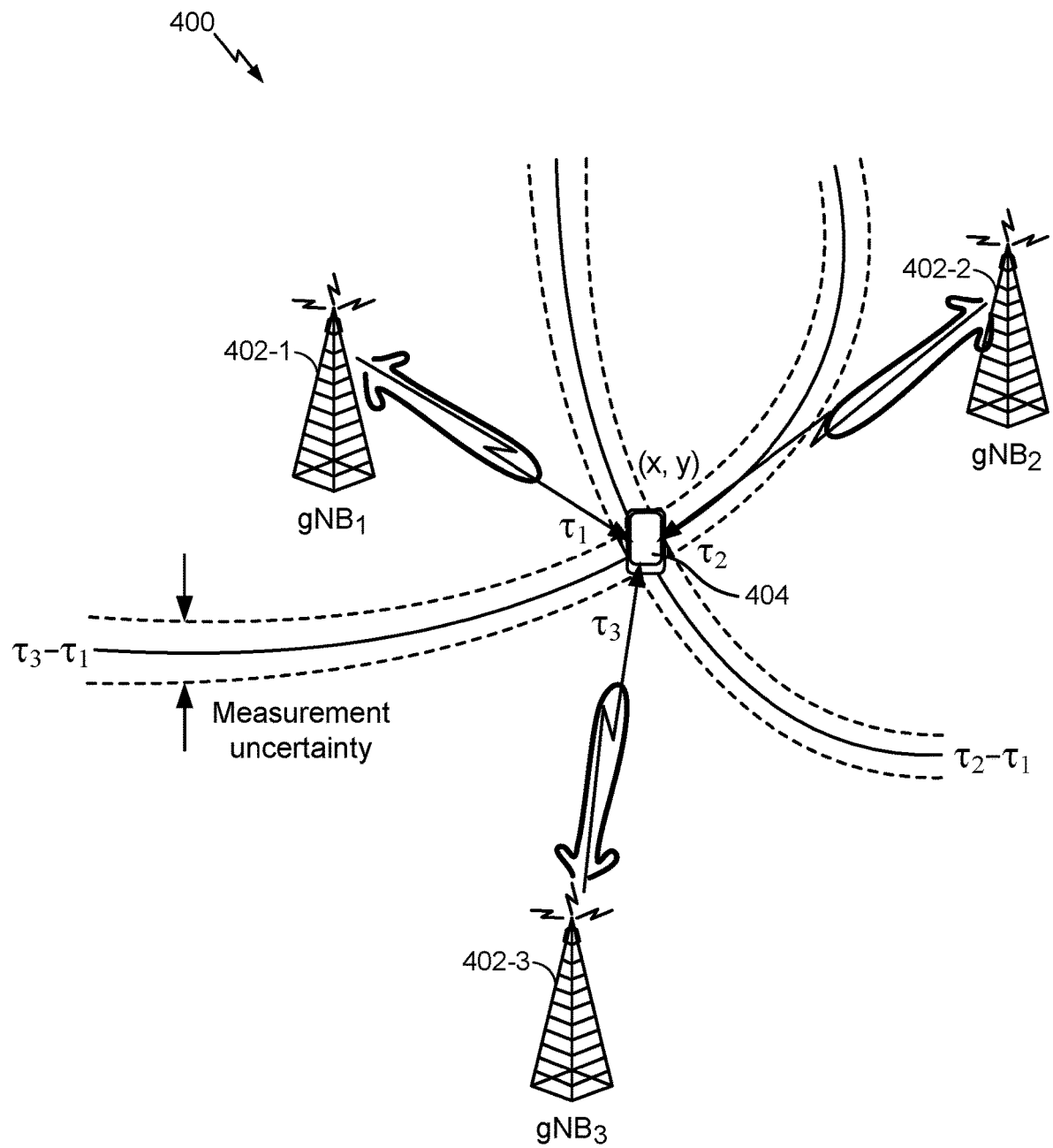
FIG. 4 is a diagram illustrating an exemplary technique for determining a position of a mobile device using information obtained from a plurality of base stations, according to aspects of the disclosure.

FIG. 4 illustrates an exemplary wireless communications system 400 according to various aspects of the disclosure. In the example of FIG. 4, a UE 404, which may correspond to any of the UEs described herein, is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402-1, 402-2, and 402-3 (collectively, base stations 402), which may correspond to any combination of the base stations described herein, using RF signals and standardized protocols for the modulation of the RF signals and the exchange of information packets. By extracting different types of information from the exchanged RF signals, and utilizing the layout of the wireless communications system 400 (e.g., the base stations' locations, geometry, etc.), the UE 404 may determine its position, or assist in the determination of its position, in a predefined reference coordinate system. In an aspect, the UE 404 may specify its position using a two-dimensional (2D) coordinate system; however, the aspects disclosed herein are not so limited, and may also be applicable to determining positions using a three-dimensional (3D) coordinate system, if the extra dimension is desired. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., PRS, NRS, transmitter reference signals (TRS), cell-specific reference signals (CRS), channel state information reference signals (CSI-RS), primary synchronization signals (PSS), secondary synchronization signals (SSS), etc.) to UEs 404 in their coverage area to enable a UE 404 to measure characteristics of such reference RF signals. For example, the observed time difference of arrival (OTDOA) positioning method, defined by 3GPP (e.g., in 3GPP Technical Specification (TS) 36.355) for wireless networks that provide wireless access using 5G NR, is a multilateration method in which the UE 404 measures the time difference, known as an RSTD, between specific reference RF signals (e.g., PRS, CRS, CSI-RS, etc.) transmitted by different pairs of network nodes (e.g., base stations 402, antennas of base stations 402, etc.) and either reports these time differences to a location server, such as the location server 230 or LMF 270, or computes a location estimate itself from these time differences.

The term "position estimate" is used herein to refer to an estimate of a position for a UE, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as, for example, a "position method" or as a "positioning method." A position estimate may include an expected error or uncertainty (e.g., by including an area or volume within which the location is expected to be included with some specified or default level of confidence).

Generally, RSTDs are measured between a reference network node (e.g., base station 402-1 in the example of FIG. 4) and one or more neighbor network nodes (e.g., base stations 402-2 and 402-3 in the example of FIG. 4). The reference network node remains the same for all RSTDs measured by the UE 404 for any single positioning use of OTDOA and would typically correspond to the serving cell for the UE 404 or another nearby cell with good signal strength at the UE 404. In an aspect, where a measured network node is a cell supported by a base station, the neighbor network nodes would normally be cells supported by base stations different from the base station for the reference cell and may have good or poor signal strength at the UE 404. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., location server 230, LMF 270) may provide OTDOA assistance data to the UE 404 for the reference network node (e.g., base station 402-1 in the example of FIG. 4) and the neighbor network nodes (e.g., base stations 402-2 and 402-3 in the example of FIG. 4) relative to the reference network node. For example, the assistance data may provide the center channel frequency of each network node, various reference RF signal configuration parameters (e.g., the number of consecutive positioning subframes, periodicity of positioning subframes, muting sequence, frequency hopping sequence, reference RF signal identifier (ID), reference RF signal bandwidth), a network node global ID, and/or other cell related parameters applicable to OTDOA. The OTDOA assistance data may indicate the serving cell for the UE 404 as the reference network node.

In some cases, OTDOA assistance data may also include "expected RSTD" parameters, which provide the UE 104 with information about the RSTD values the UE 404 is expected to measure at its current location between the reference network node and each neighbor network node, together with an uncertainty of the expected RSTD parameter. The expected RSTD, together with the associated uncertainty, may define a search window for the UE 404 within which the UE 404 is expected to measure the RSTD value. OTDOA assistance information may also include reference RF signal configuration information parameters, which allow a UE 404 to determine when a reference RF signal positioning occasion occurs on signals received from various neighbor network nodes relative to reference RF signal positioning occasions for the reference network node, and to determine the reference RF signal sequence transmitted from various network nodes in order to measure a signal time of arrival (ToA) or RSTD.

In an aspect, while the location server (e.g., location server 230, LMF 270) may send the assistance data to the UE 404, alternatively, the assistance data can originate directly from the network nodes (e.g., base stations 402) themselves (e.g., in periodically broadcasted overhead messages, etc.). Alternatively, the UE 404 can detect neighbor network nodes itself without the use of assistance data.

The UE 404 (e.g., based in part on the assistance data, if provided) can measure and (optionally) report the RSTDs between reference RF signals received from pairs of network nodes. Using the RSTD measurements, the known absolute or relative transmission timing of each network node, and the known position(s) of the transmitting antennas for the reference and neighboring network nodes, the network (e.g., location server 230/LMF 270, a base station 402) or the UE 404 may estimate a position of the UE 404. More particularly, the RSTD for a neighbor network node "k" relative to a reference network node "Ref" may be given as $(ToA_k - ToA_{Ref})$, where the ToA values may be measured modulo one subframe duration (1 ms) to remove the effects of measuring different subframes at different times. In the example of FIG. 4, the measured time differences between the reference cell of base station 402-1 and the cells of neighboring base stations 402-2 and 402-3 are represented as $\tau_2-\tau_1$ and $\tau_3-\tau_1$, where $\tau_1$, $\tau_2$, and $\tau_3$ represent the ToA of a reference RF signal from the transmitting antenna(s) of base station 402-1, 402-2, and 402-3, respectively. The UE 440 may then convert the ToA measurements for different network nodes to RSTD measurements (e.g., as defined in 3GPP TS 36.214 entitled "Physical layer; Measurements") and (optionally) send them to the location server 230/LMF 270. Using (i) the RSTD measurements, (ii) the known absolute or relative transmission timing of each network node, (iii) the known position(s) of physical transmitting antennas for the reference and neighboring network nodes, and/or (iv) directional reference RF signal characteristics such as a direction of transmission, the UE's 404 position may be determined (either by the UE 404 or the location server 230/LMF 270).

Still referring to FIG. 4, when the UE 404 obtains a location estimate using OTDOA measured time differences, the necessary additional data (e.g., the network nodes' locations and relative transmission timing) may be provided to the UE 404 by a location server (e.g., location server 230, LMF 270). In some implementations, a location estimate for the UE 404 may be obtained (e.g., by the UE 404 itself or by the location server 230/LMF 270) from OTDOA measured time differences and from other measurements made by the UE 404 (e.g., measurements of signal timing from global positioning system (GPS) or other global navigation satellite system (GNSS) satellites). In these implementations, known as hybrid positioning, the OTDOA measurements may contribute towards obtaining the UE's 404 location estimate but may not wholly determine the location estimate.

Uplink time difference of arrival (UTDOA) is a similar positioning method to OTDOA, but is based on uplink reference RF signals (e.g., sounding reference signals (SRS), uplink positioning reference signals (UL PRS)) transmitted by the UE (e.g., UE 304). Further, transmission and/or reception beamforming at the base station 302 and/or UE 304 can enable wideband bandwidth at the cell edge for increased precision. Beam refinements may also leverage channel reciprocity procedures in 5G NR.

As used herein, a "network node" may be a base station (e.g., a base station 302), a cell of a base station (e.g., a cell of a base station 302), an RRH, a DAS, an antenna of a base station (e.g., an antenna of a base station 302, where the locations of the antennas of a base station are distinct from the location of the base station itself), an array of antennas of a base station (e.g., an array of antennas of a base station 302, where the locations of the antenna arrays are distinct from the location of the base station itself), or any other network entity capable of transmitting reference RF signals. Further, as used herein, a "network node" may also refer to a UE other than the UE being positioned.

The term "base station" may refer to a single physical transmission point or to multiple physical transmission points that may or may not be co-located. For example, where the term "base station" refers to a single physical transmission point, the physical transmission point may be an antenna of the base station (e.g., a base station 302) corresponding to a cell of the base station. Where the term "base station" refers to multiple co-located physical transmission points, the physical transmission points may be an array of antennas (e.g., as in a multiple input-multiple output (MIMO) system or where the base station employs beamforming) of the base station. Where the term "base station" refers to multiple non-co-located physical transmission points, the physical transmission points may be a DAS (a network of spatially separated antennas connected to a common source via a transport medium) or an RRH (a remote base station connected to a serving base station). Alternatively, the non-co-located physical transmission points may be the serving base station receiving the measurement report from the UE (e.g., UE 304) and a neighbor base station whose reference RF signals the UE 304 is measuring.

In order to identify the ToA of a reference RF signal transmitted by a given network node (e.g., base station 302), the UE (e.g., UE 304) first jointly processes all the resource elements on the channel on which that network node is transmitting the reference RF signal, and performs an inverse Fourier transform to convert the received RF signals to the time domain. The conversion of the received RF signals to the time domain is referred to as an estimation of the channel energy response (CER). The CER shows the peaks on the channel over time, and the earliest "significant" peak should therefore correspond to the ToA of the reference RF signal. Generally, a UE will use a noise-related quality threshold to filter out spurious local peaks, thereby presumably correctly identifying significant peaks on the channel. For example, a UE may chose a ToA estimate that is the earliest local maximum of the CER that is at least 'X' decibels (dB) higher than the median of the CER and a maximum 'Y' dB lower than the main peak on the channel. The UE determines the CER for each reference RF signal from each network node in order to determine the ToA of each reference RF signal from the different network nodes.

Figure 5A:
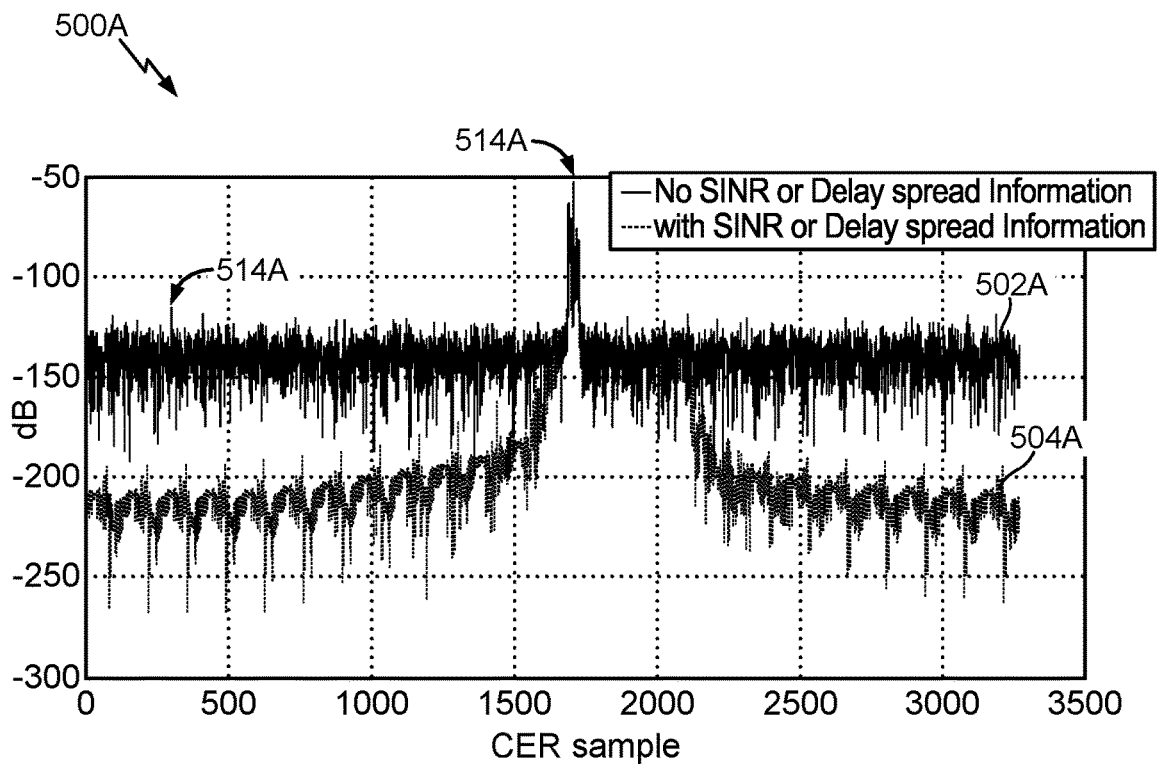
FIGS. 5A and 5B illustrate graphs of exemplary channel energy responses (CERs), according to aspects of the disclosure.
Figure 5B:
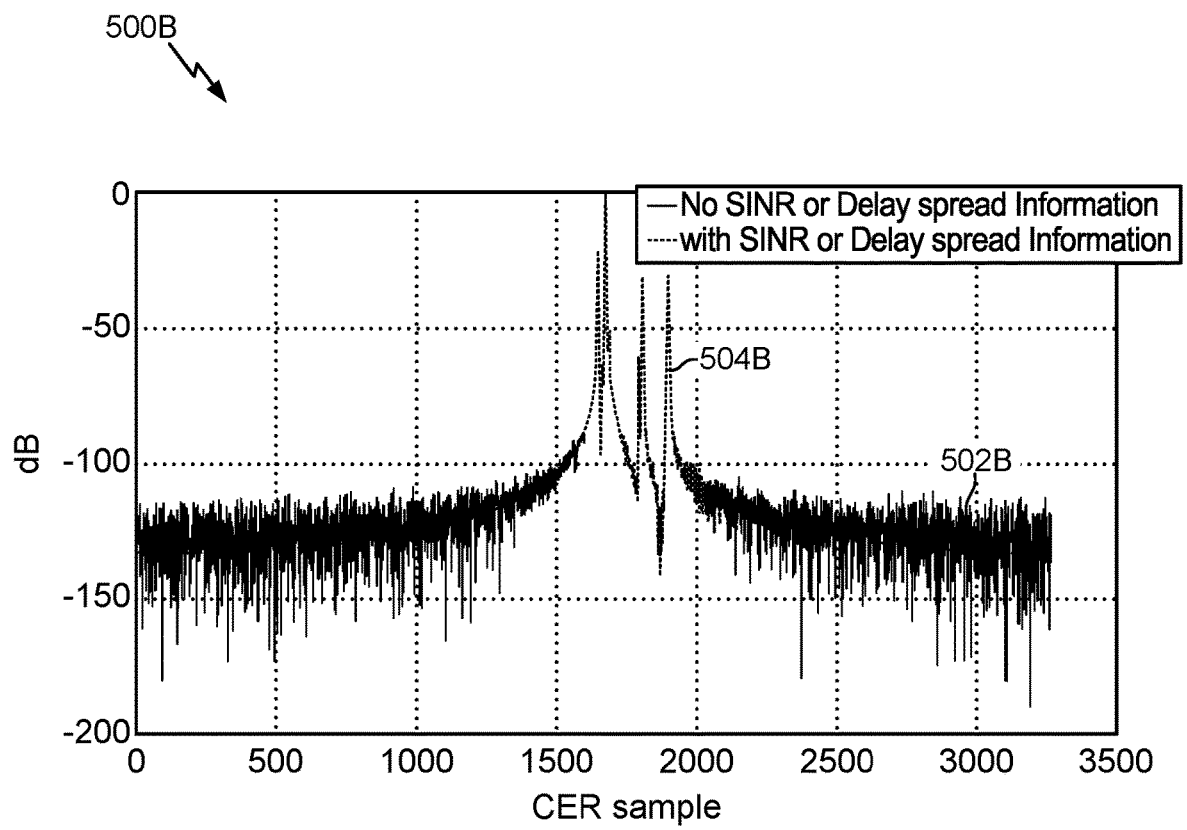

FIGS. 5A and 5B illustrate graphs 500A and 500B, respectively, of exemplary CERs, according to aspects of the disclosure. The y-axis of graphs 500A and 500B represent the power of the received RF signals in dB, and the x-axis represents time. In graph 500A, plot 502A shows the CER when the SINR (defined as the power of a certain RF signal of interest divided by the sum of the interference power from all the other interfering RF signals and the power of some background noise) or delay spread (the difference between the ToA of the earliest significant peak and the ToA of the latest peak) information is not taken into account, and plot 504A shows the CER when the SINR or delay spread information is taken into account. Likewise, in graph 500B, plot 502B shows the CER when the SINR or delay spread information is not taken into account, and plot 504B shows the CER when it is.

As shown on plot 502A, when the SINR or delay spread information is not taken into account, the peak at 512A may be incorrectly identified as a "significant" peak, and therefore as incorrectly corresponding to the ToA (approximately 300 nanoseconds (ns)) of the measured reference RF signal. In contrast, as shown on plot 514A, when the SINR or delay spread information is taken into account, the peak at 514A is correctly identified as a "significant" peak, and therefore, as corresponding to the correct ToA (approximately 1700 ns) of the measured reference RF signal. Thus, as can be seen in FIGS. 5A and 5B, when the SINR and/or delay spread are taken into account, it is much easier to identify an actual peak, versus the spurious peaks caused by background noise on the channel. As such, knowledge of the delay spread and/or SINR could provide cleaner CERs, and therefore, potentially fewer first-peak misdetections.

Certain network nodes (whether a base station or a UE), especially those capable of 5G NR communication, may use beamforming to send and receive information over a wireless channel. Transmit beams may be quasi-collocated, meaning that they appear to the receiver as having the same parameters, regardless of whether or not the transmitting antennas themselves are physically collocated. In 5G NR, there are four types of quasi-collocation (QCL) relations. A QCL relation of a given type means that certain parameters about a second reference RF signal on a second transmit beam can be derived from information about a source reference RF signal on a source transmit beam. Specifically, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

Figure 6:
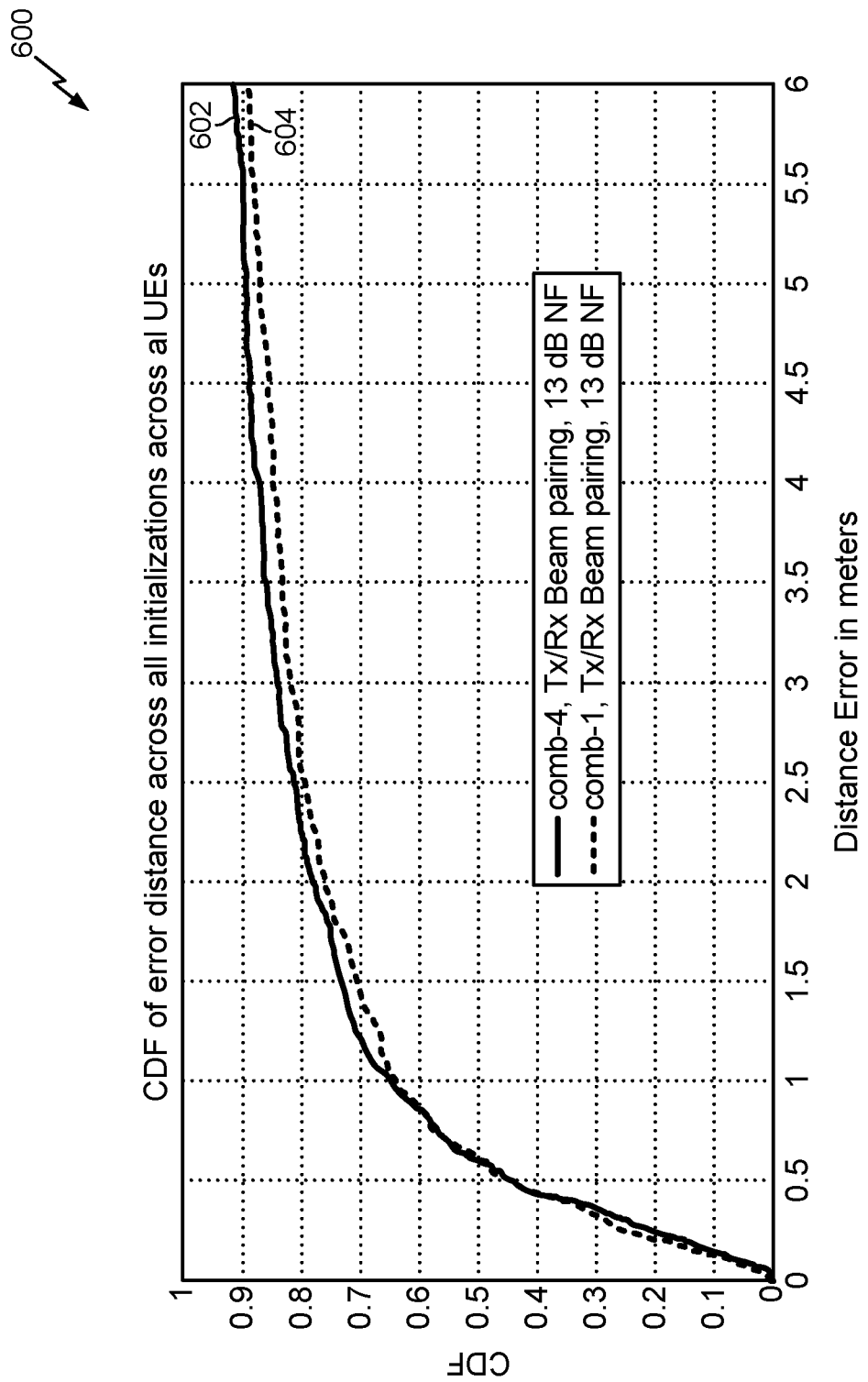
FIG. 6 is a graph comparing a cumulative distribution function (CDF) to a distance error for all initializations across all UEs of a particular sample set, according to aspects of the disclosure.

FIG. 6 shows a graph 600 comparing a cumulative distribution function (CDF) to the distance error in meters for all initializations across all UEs of a particular sample set, according to aspects of the disclosure. Plot 602 illustrates the results of a comb-1 PRS pattern, transmit/receive beam pairing (i.e., both transmitter and receiver use beamforming), and 13 dB noise figure (NF). Plot 604 illustrates the results of a comb-4 PRS pattern, transmit/receive beam pairing, and 13 dB NF. In the example of FIG. 6, the comb-4 pattern has an energy per resource element (EPRE) ratio of 6 dB. As can be seen in FIG. 6, the performance loss appears in the tail of the CDF, after approximately the 60% percentile.

Figure 7:
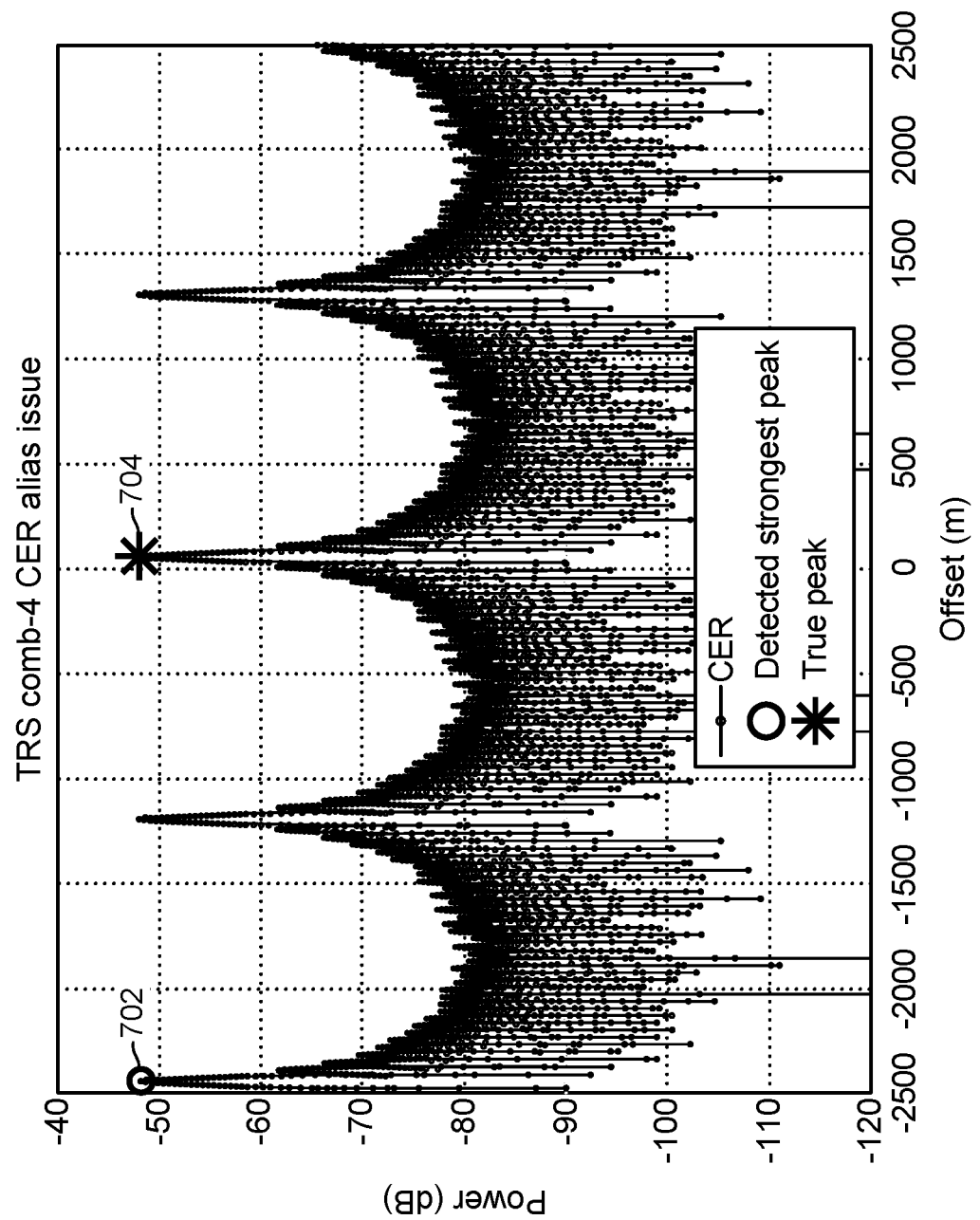
FIGS. 7 to 8B are graphs of exemplary CER estimates, according to aspects of the disclosure

If there are gaps in the frequency domain, such as with a comb-4 pattern (where reference RF signals are transmitted in the same OFDM symbol every fourth subcarrier), it results in aliasing of the CER, especially where the measured network node is far away. Aliasing is a result of converting the frequency domain to the time domain when estimating the CER, and appears as multiple equally-sized peaks, as shown in FIG. 7. FIG. 7 shows a graph 700 of a CER estimate where the detected reference RF signal is transmitted using a comb-4 pattern, according to aspects of the disclosure. As shown in FIG. 7, the CER has four significant peaks, due to the fact that the reference RF signal is being transmitted with a comb-4 pattern and the UE (e.g., UE 304) is far away from the network node. However, the UE may be unaware of this issue, and only one of these peaks is useful. Thus, in the example of FIG. 7, the UE detects a significant peak at 702 and falsely identifies it as the strongest detected peak. In reality, the true peak is at 704. This is an issue with the frequency domain subsampling from using comb-4, especially where the UE is far from the network node. For reference, the CER graphs in FIGS. 5A and 5B show the CER for a comb-1 pattern.

As such, it would be beneficial for a UE that has detected aliasing in the CER to be able to identify which is the true peak for the channel. Accordingly, the present disclosure proposes a new QCL type that configures a QCL source reference RF signal for the "average delay" (the average of the time the first channel tap of a multipath RF signal is received and the time the last channel tap of the multipath RF signal is received) or the "delay spread" (the time from when the first channel tap of a multipath RF signal is received to the time when the last channel tap of the multipath RF signal is received) or both, to enable the UE (e.g., UE 304) to derive these values for a subsequently transmitted reference RF signal. If another reference RF signal is received as a QCL source for the "average delay" and/or "delay spread" for other reference RF signals on the channel, then the UE can estimate a crude CER from the source reference RF signal, determine a valid window of where to look in the CER for the main peak of a reference RF signal received on the channel, receive a subsequent reference RF signal, and search for the ToA inside the determined window. As would be appreciated, the actual transmission parameters allowable for a reference RF signal having QCL parameters for "average delay" and/or "delay spread" provided can be different than those if the QCL source is not given.

Figure 8A:
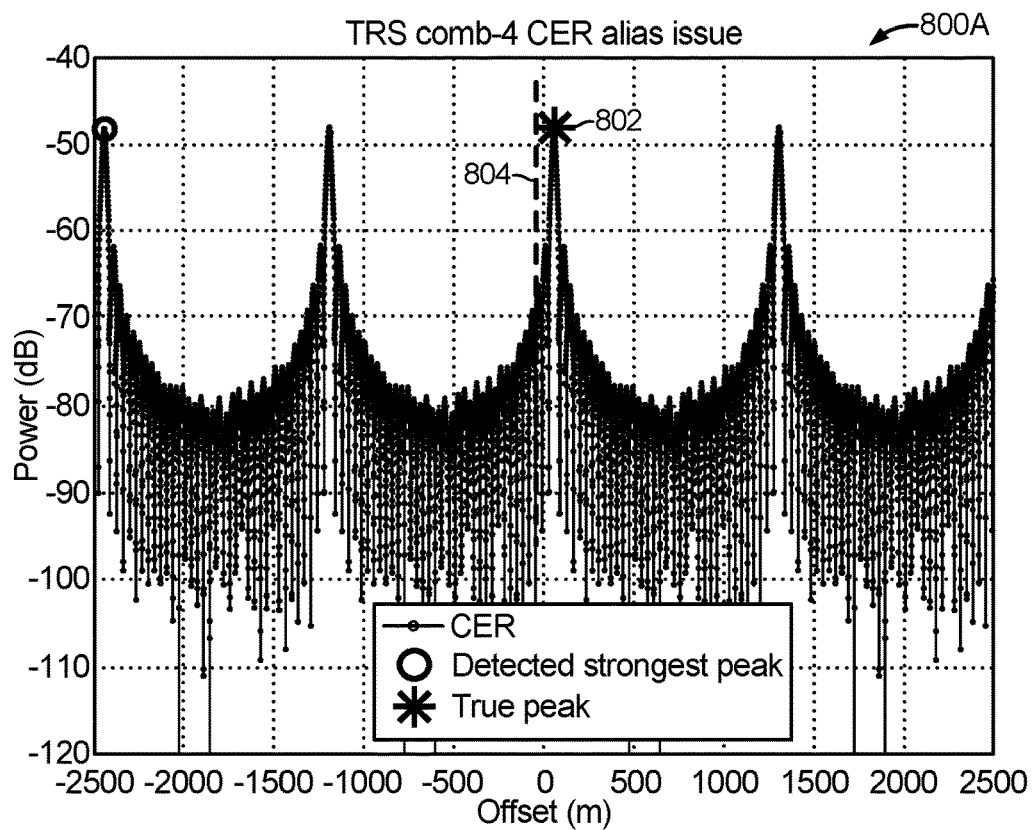

FIG. 8A shows a graph 800A of an exemplary CER for a received reference RF signal, according to aspects of the disclosure. In the example of FIG. 8A, the UE (e.g., UE 304) has received a source reference RF signal (e.g., a TRS) configured for average delay only. As such, the UE will know the average delay of subsequent reference RF signals received on this channel from this network node (e.g., base station 302). The average delay is represented as line 804. For a subsequently received reference RF signal (e.g., a PRS), the UE can listen some time threshold before and after this delay average to detect any significant peaks occurring within that threshold, and any significant peak detected (here, peak 802) can be considered the true peak for the reference RF signal.

Figure 8B:
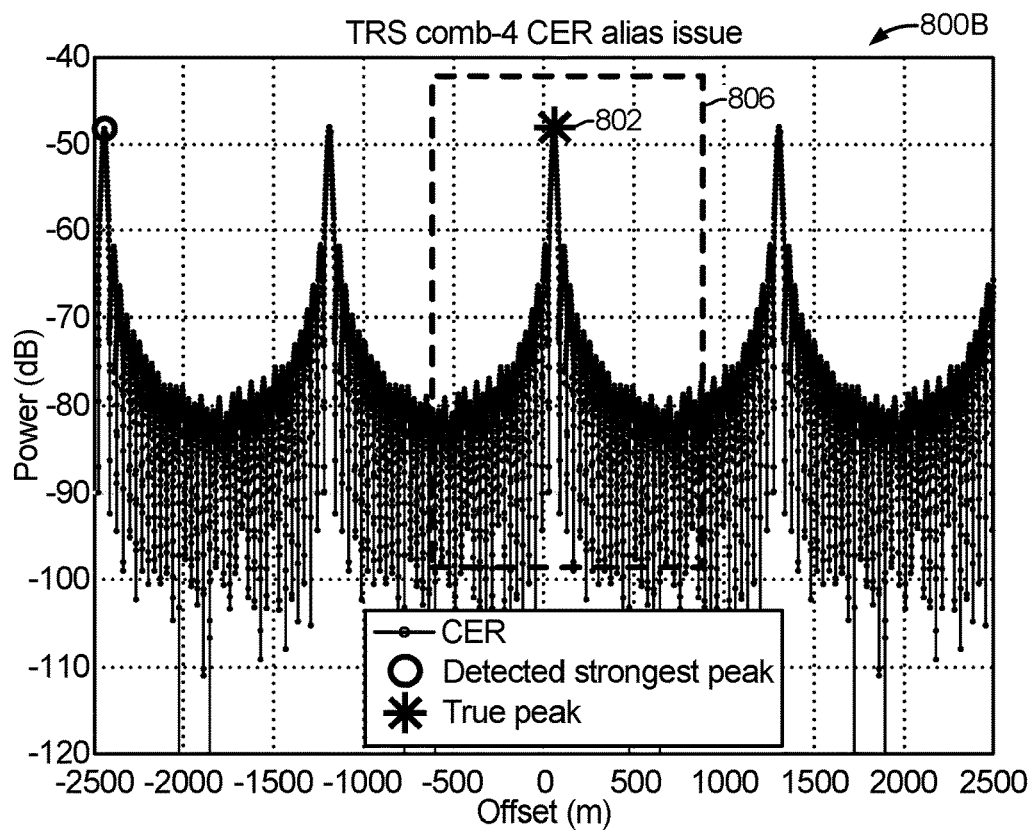

FIG. 8B shows a graph 800B of an exemplary CER for a received reference RF signal, according to aspects of the disclosure. In the example of FIG. 8B, the UE (e.g., UE 304) has received a source reference RF signal (e.g., a TRS) configured for average delay and delay spread. As such, the UE will know the average delay and delay spread of subsequent reference RF signals received on this channel from this network node (e.g., base station 302). The average delay and delay spread can be used to determine window 806. The width of window 806 is the delay spread determined from the source reference RF signal, and the center of the window 806 is set at the average delay determined from the source reference RF signal. For a subsequently received reference RF signal (e.g., a PRS), the UE can search within window 806 to detect any significant peaks occurring within the window 806, and any significant peak detected (here, peak 802) can be considered the true peak for the reference RF signal. Note that multipath peaks may appear to the UE as being aliased. As such, it is preferable, when possible, to have both the average delay and delay spread.

The present disclosure proposes to define new QCL relations, and use the synchronization signal block (SSB) as the source reference RF signal for these new QCL relations. For convenience, these new QCL types are referred to as QCL Type E1, E2, and E. For a QCL Type E1, the UE can use the source reference RF signal (an SSB) to estimate the average delay of a second reference RF signal transmitted on the same channel. For a QCL Type E2, the UE can use the source reference RF signal (an SSB) to estimate the delay spread of a second reference RF signal transmitted on the same channel. For a QCL Type E, the UE can use the source reference RF signal (an SSB) to estimate the average delay and delay spread of a second reference RF signal transmitted on the same channel. The QCL type (E1/E2/E) could be a field in the SSB, and based on the QCL type contained in the SSB, the UE would know which measurements it could take of the SSB (delay spread, average delay, both).

Thus, reference RF signals transmitted on a given channel may be configured to have QCL Type E1, Type E2, or both (Type E), and this configuration may be conveyed in another downlink reference RF signal, such as an SSB for the network node. Currently in 5G NR, QCL Type C or Type C/D is allowed when the SSB is the source reference RF signal. The disclosure would add Type E. Alternatively, a statement could be added to the applicable standard that when a reference RF signal is configured for QCL Type D, it is implicitly assumed that QCL Type E1 or E2 or both true also. This allows a UE to receive an SSB from the network node and make a crude estimate of the average delay and/or delay spread for reference RF signals from that network node depending on the QCL type provided (E1/E2/E), and then receive a subsequent reference RF signal and search for the early peak inside that smaller window.

A network node (e.g., base station 302) may use different sets of reference RF signal transmission parameters if a QCL Type E source reference RF signal is provided. For example, QCL Type E (or E1 or E2) would allow a higher comb-type to be used for PRS; otherwise, a full-comb PRS (e.g., comb-1) should be used. This is because if a higher comb-level is used, aliasing is more likely to occur. However, if the PRS is configured with a source reference RF signal (e.g., an SSB) of QCL Type E1/E2/E, then the UE can prune out the aliased CER and look for the earliest peak inside the determined window, as discussed above with reference to FIGS. 8A and 8B. Further, if a QCL Type E source reference RF signal is provided, the comb can be even higher than when only a QCL Type E1 source reference RF signal is provided. For example, for a QCL Type E1 source, a PRS with comb-2 could be transmitted, but for a QCL Type E source, a PRS with comb-12 could be transmitted.

A network node may use different sets of reference RF signal transmission parameters if a QCL Type E2 (delay spread) source reference RF signal (e.g., an SSB) is provided but not a QCL Type E1 (average delay) source. For example, when a QCL Type E2 source reference RF signal is provided for subsequent reference RF signals (e.g., PRS), then the subsequent reference RF signals from different cells can be allowed to be orthogonally code-division multiplexed (i.e., cyclic-shifted) with a configured cyclic shift. A cyclic shift changes the "average delay" of the channel, so in this case, the subsequent reference RF signals' "average delay" can be assumed to be the "average delay" of the source reference RF signal plus the cyclic shift. This is illustrated in FIG. 9.

Figure 9:
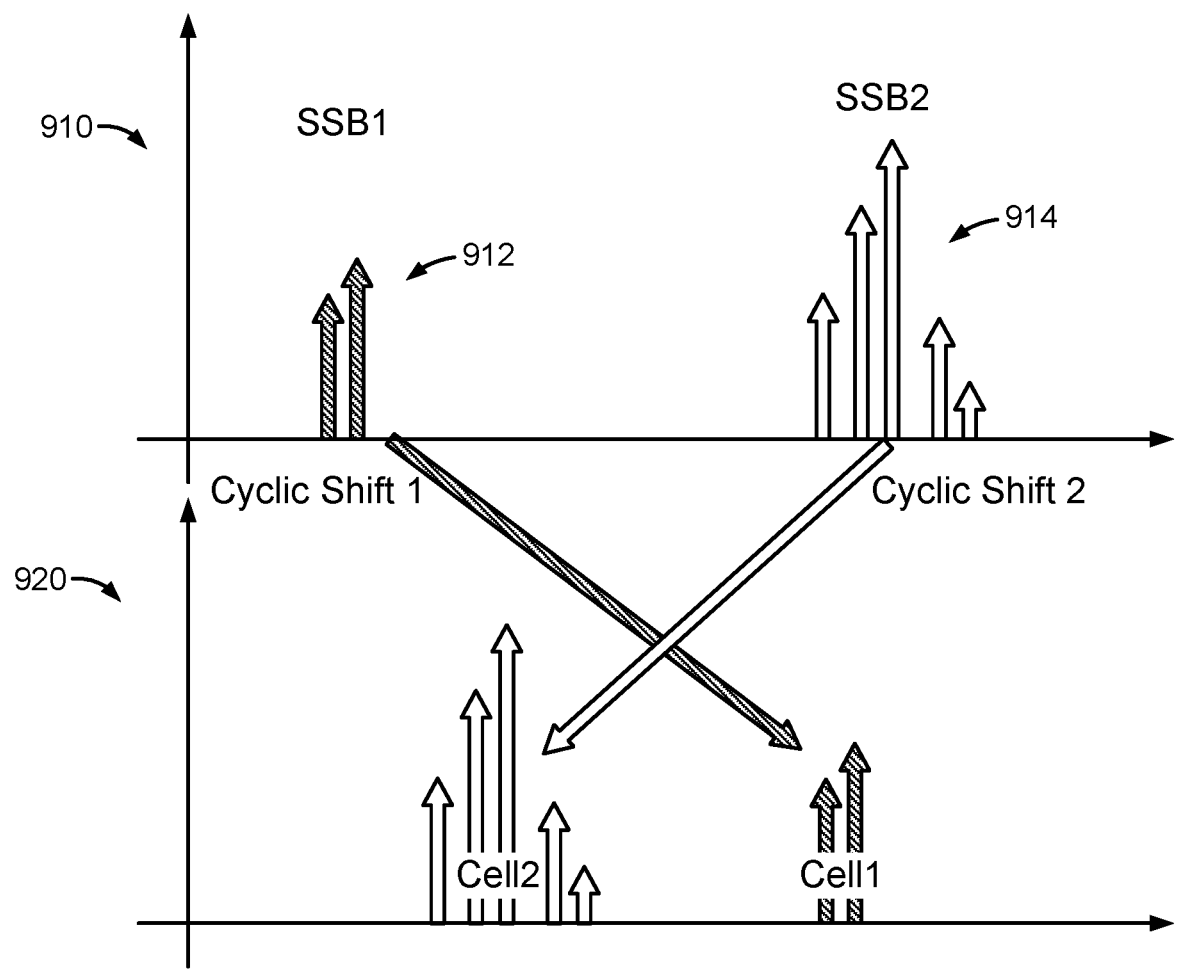
FIG. 9 illustrates how cyclic shift changes the average delay of a wireless channel, according to aspects of the disclosure.

In FIG. 9, as shown in graph 910, the UE detects a cluster of channel taps 912 for the SSB ("SSB1") of a first cell ("cell 1"), and a cluster of channel taps 914 for the SSB ("SSB2") of a second cell ("cell 2"). Although the UE detects the SSB1 before SSB2, it knows that these SSBs have been cycle shifted, and the amount of the cycle shift. As such, the UE can add the cyclic shift to the average delay, resulting in graph 920, which accurately represents the order in which the SSBs would have been received without the cyclic shift.

As another example, the UE may be configured with 'N' PRS resources (a PRS resource is a collection of resource elements that are used for transmission of PRS and may correspond to a beam or a cell of the network node) from 'N' cells, each one with a different cyclic shift, on the same OFDM symbol. Each PRS resource may be configured with a QCL Type E2 by a corresponding SSB. The UE, by measuring the SSB, can determine an appropriate window for each cell, which can then be shifted according to the configured cyclic shift.

As yet another example, if a QCL Type E2 source reference RF signal (e.g., an SSB) is provided for all PRS resources transmitted on the same OFDM symbol, then a higher number of cyclic shifts can be configured to the UE compared to the case where the QCL Type E2 source is not provided.

As yet another example, if a QCL Type E2 source reference RF signal (e.g., an SSB) is provided and cyclic shifts are used for network node (e.g., base station 302) orthogonalization, then a Zadoff-Chu sequence can be used as a PRS sequence.

Note that although the foregoing has generally been described in terms of a network node, such as a base station, transmitting downlink reference RF signals and the QCL type to a UE, as will be appreciated, a UE could transmit uplink reference RF signals and the QCL type to the network node, and different network nodes, whether base stations or UEs, could transmit reference RF signals and the QCL type to each other.

Figure 10:
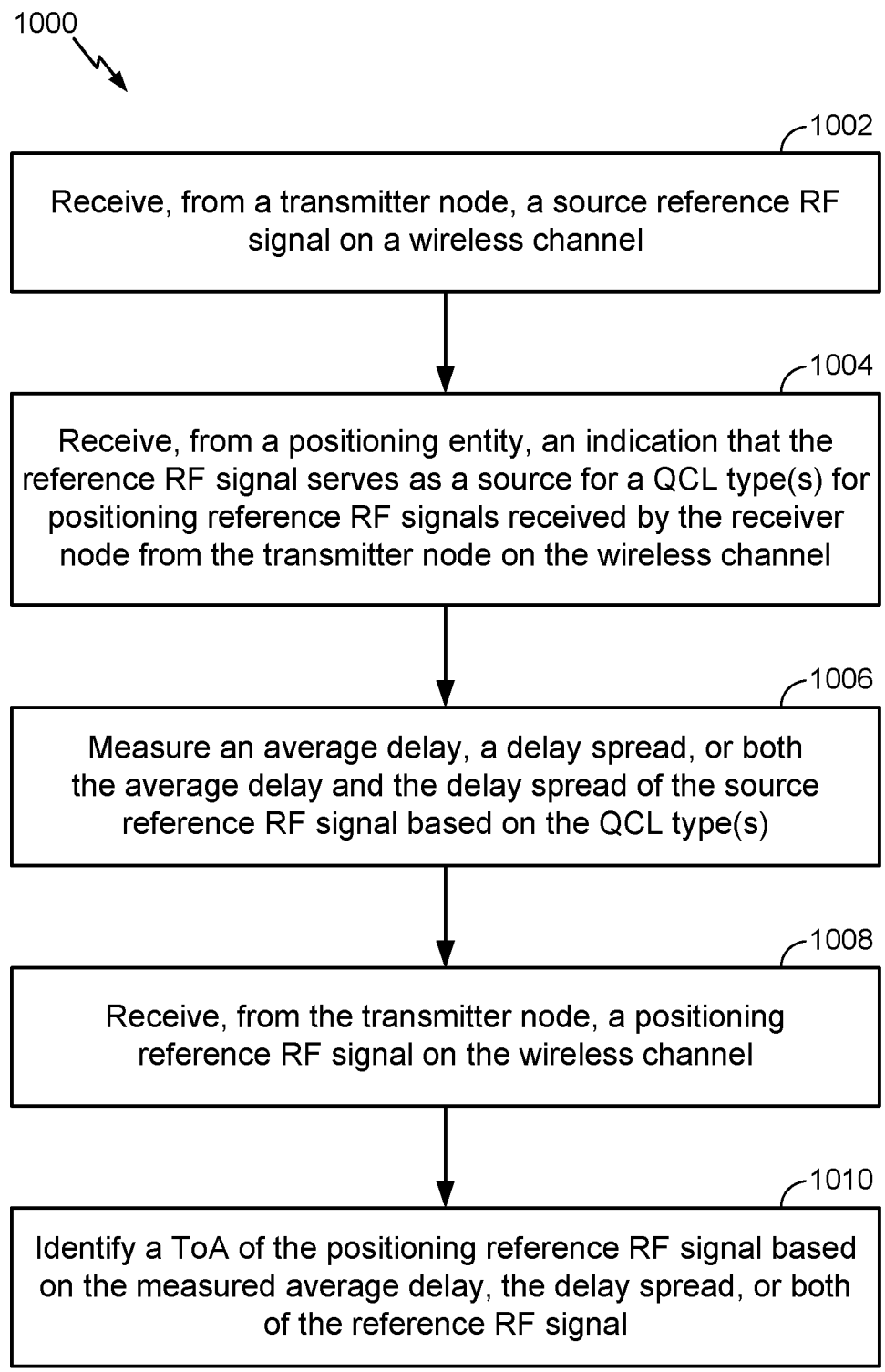
FIGS. 10 and 11 illustrate exemplary methods for wireless communication, according to aspects of the disclosure.

FIG. 10 illustrates an exemplary method 1000 for receiving reference RF signals for positioning estimation, according to aspects of the disclosure. The method 1000 may be performed by a receiver device (e.g., UE 304 on the downlink or base station 302 on the uplink).

At 1002, the receiver device (e.g., receiver 354*a* and/or RX processor 356, or receiver 318*b* and/or RX processor 370) receives, from a transmission point (e.g., UE 304 on the uplink or base station 302 on the downlink, an antenna or antenna array of base station 302, an RRH, a DAS, etc.), a reference RF signal (e.g., an SSB) on a wireless channel (e.g., communication link 120). In an aspect, the reference RF signal comprises an SSB.

At 1004, the receiver device (e.g., receiver 354*a* and/or RX processor 356, or receiver 318*b* and/or RX processor 370) receives, from a positioning entity (e.g., location server 230 or LMF 270), an indication that the reference RF signal serves as a source for a QCL type(s) (e.g., E1/E2/E) for positioning reference RF signals received by the receiver device from the transmission point on the wireless channel.

At 1006, the receiver device (e.g., channel estimator 358 and/or RX processor 356, or channel estimator 374 and/or RX processor 370) measures an average delay, a delay spread, or both the average delay and the delay spread of the source reference RF signal based on the QCL type(s). In an aspect, the average delay comprises an average of a first time at which a first channel tap of the reference RF signal is received and a second time at which a last channel tap of the reference RF signal is received. In an aspect, the delay spread comprises an amount of time from a first time at which a first channel tap of the reference RF signal is received to a second time at which a last channel tap of the reference RF signal is received.

At 1008, the receiver device (e.g., receiver 354*a* and/or RX processor 356, or receiver 318*b* and/or RX processor 370) receives, from the transmission point, a positioning reference RF signal (e.g., PRS, NRS, TRS, CRS, CSI-RS, etc.) on the wireless channel.

At 1010, the receiver device (e.g., channel estimator 358 and/or RX processor 356, or channel estimator 374 and/or RX processor 370) identifies a ToA of the positioning reference RF signal based on the measured average delay, the delay spread, or both the average delay and the delay spread of the reference RF signal.

In an aspect, the method 1000 may further include (not shown) calculating a CER for the positioning reference RF signal, and identifying the ToA of the positioning reference RF signal based on a peak in the CER for the positioning reference RF signal occurring within a time period (window) defined by the average delay, the delay spread, or both the average delay and the delay spread.

In an aspect, the receiver device may be configured with a plurality of positioning reference RF signal resources from a plurality of cells, wherein each positioning reference RF signal resource is carried on the same OFDM symbol and has a different cyclic shift. In this case, the method 1000 further includes (not shown) measuring, for each positioning reference RF signal resource, a delay spread of a reference RF signal transmitted on the positioning reference RF signal resource, determining, for each cell, a time period defined by the delay spread of the reference RF signal transmitted on the positioning reference RF signal resource of that cell, and shifting, for each cell, the time period based on the cyclic shift of the positioning reference RF signal resource of that cell. The method 1000 may further include (not shown) receiving, from the transmission point, a positioning reference RF signal on each of the plurality of positioning reference RF signal resources, wherein a sequence used for each positioning reference RF signal is a Zadoff-Chu sequence, and wherein each cell shifts the Zadoff-Chu sequence with the respective cycle shift.

In an aspect, the method 1000 further includes (not shown) receiving, at the receiver device from a second transmission point, a second reference RF signal on a second wireless channel, receiving, at the receiver device from the transmission point, an indication that the second reference RF signal serves as a source for a second QCL type(s) for positioning reference RF signals received by the receiver device from the second transmission point on the second wireless channel, measuring, by the receiver device, a second average delay, a second delay spread, or both the second average delay and the second delay spread of the second reference RF signal based on the second QCL type(s), receiving, at the receiver device from the second transmission point, a second positioning reference RF signal on the second wireless channel, and identifying, by the receiver device, a second ToA of the second positioning reference RF signal based on the second average delay, the second delay spread, or both the second average delay and the second delay spread of the second reference RF signal. In an aspect, the method 1000 may further include (not shown) performing a positioning operation based on the ToA of the positioning reference RF signal and the second ToA of the second positioning reference RF signal, wherein the positioning operation comprises a calculation of a RSTD between the ToA and the second ToA. In an aspect, the receiver device reports the RSTD to the positioning entity.

In an aspect, the QCL type(s) indicates that the reference RF signal and the positioning reference RF signal have the same average delay only, the same delay spread only, or both the same average delay and the same delay spread. In an aspect, based on the QCL type(s) indicating that the reference RF signal and the positioning reference RF signal have both the same average delay and the same delay spread, the transmission point uses a higher comb-type to transmit the positioning reference RF signal than where the QCL type(s) indicates that the reference RF signal and the positioning reference RF signal have the same average delay only or the same delay spread only. In an aspect, the transmission point uses a higher comb-type to transmit the positioning reference RF signal than could be used if the QCL type(s) did not indicate that the reference RF signal and the positioning reference RF signal have the same average delay only, the same delay spread only, or both the same average delay and the same delay spread.

Figure 11:
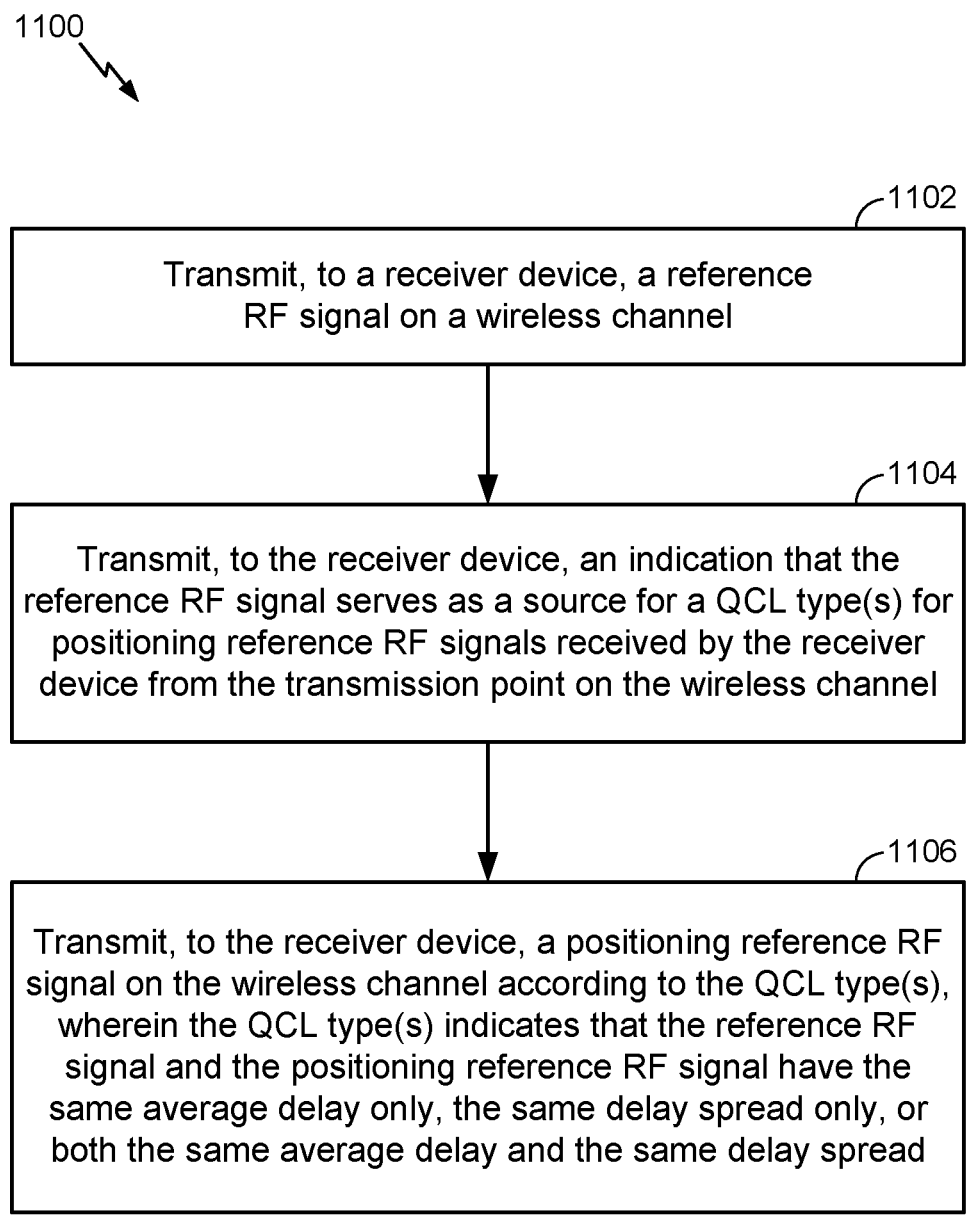

FIG. 11 illustrates an exemplary method 1100 for transmitting reference RF signals for positioning estimation, according to aspects of the disclosure. The method 1100 may be performed by a transmission point (e.g., UE 304 on the uplink, an antenna or antenna array of UE 304, base station 302 on the downlink, an antenna or antenna array of base station 302, etc.).

At 1102, the transmission point (e.g., transmitter 318a and/or TX processor 316, or transmitter 354b and/or TX processor 368) transmits, to a receiver device (e.g., UE 304 on the downlink or base station 302 on the uplink), a reference RF signal on a wireless channel.

At 1104, the transmission point (e.g., transmitter 318a and/or TX processor 316, or transmitter 354b and/or TX processor 368) transmits, to the receiver device, an indication that the reference RF signal serves as a source for a QCL type(s) for positioning reference RF signals received by the receiver device from the transmission point on the wireless channel.

At 1102, the transmission point (e.g., transmitter 318a and/or TX processor 316, or transmitter 354b and/or TX processor 368) transmits, to the receiver device, a positioning reference RF signal on the wireless channel according to the QCL type(s), wherein the QCL type(s) indicates that the reference RF signal and the positioning reference RF signal have the same average delay only, the same delay spread only, or both the same average delay and the same delay spread.

In an aspect, the method 1100 further includes (not shown) receiving, from the receiver device, a ToA of the positioning reference RF signal calculated based on a measured average delay, a measured delay spread, or both the measured average delay and the measured delay spread of the reference RF signal.

In an aspect, based on the QCL type(s) indicating that the reference RF signal and the positioning reference RF signals have both the same average delay and the same delay spread, the transmission point uses a higher comb-type to transmit the positioning reference RF signal than where the QCL type(s) indicates that the reference RF signal and the positioning reference RF signal have the same average delay only or the same delay spread only.

In an aspect, the transmission point uses a higher comb-type to transmit the positioning reference RF signal than could be used if the QCL type(s) did not indicate that the reference RF signal and the positioning reference RF signal have the same average delay only, the same delay spread only, or both the same average delay and the same delay spread.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a compact disk (CD), laser disc, optical disk, digital video disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of wireless communication performed by a receiver device, comprising:
    receiving, from a positioning entity, an indication that a reference radio frequency (RF) signal received by the receiver device from a transmission point is a source for one or more quasi-collocation (QCL) types for positioning reference RF signals received by the receiver device from the transmission point, wherein the one or more QCL types indicate an association of an average delay, a delay spread, or both the average delay and the delay spread between the reference RF signal and the positioning reference RF signals;
    receiving, from the transmission point, a positioning reference RF signal; and
    determining a positioning measurement of the positioning reference RF signal.

2. The method of claim 1, wherein the positioning measurement is determined based on the average delay, the delay spread, or both the average delay and the delay spread of the reference RF signal.

3. The method of claim 1, wherein determining the positioning measurement comprises:
    calculating a channel energy response for the positioning reference RF signal; and
    identifying a time of arrival (ToA) of the positioning reference RF signal based on a peak in the channel energy response for the positioning reference RF signal occurring within a time period defined by the average delay, the delay spread, or both the average delay and the delay spread.

4. The method of claim 1, wherein the average delay comprises an average of a first time at which a first channel tap of the reference RF signal is received and a second time at which a last channel tap of the reference RF signal is received.

5. The method of claim 1, wherein the delay spread comprises an amount of time from a first channel tap of the reference RF signal to a last channel tap of the reference RF signal.

6. The method of claim 1, wherein the reference RF signal comprises a synchronization signal block (SSB).

7. The method of claim 1, wherein the positioning reference RF signal comprises a positioning reference signal (PRS).

8. The method of claim 1, wherein the receiver device is configured with a plurality of positioning reference RF signal resources for a plurality of cells, wherein each positioning reference RF signal resource is carried on the same orthogonal frequency division multiplexing (OFDM) symbol and has a different cyclic shift, the method further comprising:
    measuring, for each positioning reference RF signal resource, a delay spread of a reference RF signal transmitted on the positioning reference RF signal resource;
    determining, for each cell, a time period defined by the delay spread of the reference RF signal transmitted on the positioning reference RF signal resource of that cell; and
    shifting, for each cell, the time period based on the cyclic shift of the positioning reference RF signal resource of that cell.

9. The method of claim 8, further comprising:
    receiving, from the transmission point, a positioning reference RF signal on each of the plurality of positioning reference RF signal resources,
    wherein a sequence used for each positioning reference RF signal is a Zadoff-Chu sequence, and wherein each cell shifts the Zadoff-Chu sequence with the respective cycle shift.

10. The method of claim 1, further comprising:
    receiving, at the receiver device from a second transmission point, an indication that a second reference RF signal received by the receiver device from the second transmission point is a source for one or more second QCL types for second positioning reference RF signals received by the receiver device from the second transmission point, wherein the one or more second QCL types indicate an association of a second average delay, a second delay spread, or both the second average delay and the second delay spread between the second reference RF signal and the second positioning reference RF signals;
    receiving, at the receiver device from the second transmission point, a second positioning reference RF signal; and
    determining, by the receiver device, a second positioning measurement of the second positioning reference RF signal.

11. The method of claim 10, wherein the second positioning measurement is determined based on the second average delay, the second delay spread, or both the second average delay and the second delay spread of the second reference RF signal.

12. The method of claim 10, further comprising:
    performing a positioning operation based on the positioning measurement of the positioning reference RF signal and the second positioning measurement of the second positioning reference RF signal,
wherein the positioning measurement comprises a reference signal timing difference (RSTD) between a ToA of the positioning reference RF signal and the second positioning reference RF signal.

13. The method of claim 1, wherein, based on the one or more QCL types indicating the association of both the average delay and the delay spread between the reference RF signal and the positioning reference RF signal, a higher comb-type is used to transmit the positioning reference RF signal than where the one or more QCL types indicate the association of the average delay or the delay spread between the reference RF signal and the positioning reference RF signal.

14. The method of claim 1, wherein a higher comb-type is used to transmit the positioning reference RF signal than could be used where the one or more QCL types do not indicate the association of the average delay, the delay spread, or both the average delay and the delay spread between the reference RF signal and the positioning reference RF signal.

15. The method of claim 1, wherein the receiver device comprises a user equipment (UE) and the transmission point comprises a base station.

16. The method of claim 1, wherein the receiver device comprises a base station and the transmission point comprises a user equipment (UE).

17. A method of wireless communication performed by a transmission point, comprising:
transmitting, to a receiver device, a reference RF signal;
transmitting, to the receiver device, an indication that the reference RF signal is a source for one or more quasi-collocation (QCL) types for positioning reference RF signals transmitted to the receiver device by the transmission point; and
transmitting, to the receiver device, a positioning reference RF signal, wherein the reference RF signal and the positioning reference RF signal have the same average delay, the same delay spread, or both the same average delay and the same delay spread based on the reference RF signal and the positioning reference RF signal having the one or more QCL types.

18. The method of claim 17, wherein, based on the one or more QCL types indicating the association of both the average delay and the delay spread between the reference RF signal and the positioning reference RF signal, a higher comb-type is used to transmit the positioning reference RF signal than where the one or more QCL types indicate the association of the average delay or the delay spread between the reference RF signal and the positioning reference RF signal.

19. The method of claim 17, wherein a higher comb-type is used to transmit the positioning reference RF signal than could be used where the one or more QCL types do not indicate the association of the same average delay, the same delay spread, or both the same average delay and the same delay spread between the reference RF signal and the positioning reference RF signal.

20. The method of claim 17, wherein the receiver device comprises a user equipment (UE) and the transmission point comprises a base station.

21. The method of claim 20, wherein the base station is a serving base station or a neighboring base station.

22. The method of claim 17, wherein the receiver device comprises a base station and the transmission point comprises a user equipment (UE).

23. A receiver device, comprising:
a memory;
at least one transceiver; and
at least one processor communicatively coupled to the memory and the at least one transceiver, the at least one processor configured to:
receive, via the at least one transceiver, from a positioning entity, an indication that a reference radio frequency (RF) signal received by the receiver device from a transmission point is a source for one or more quasi-collocation (QCL) types for positioning reference RF signals received by the receiver device from the transmission point, wherein the one or more QCL types indicate an association of an average delay, a delay spread, or both the average delay and the delay spread between the reference RF signal and the positioning reference RF signals;
receive, via the at least one transceiver, from the transmission point, a positioning reference RF signal; and
determine a positioning measurement of the positioning reference RF signal.

24. The receiver device of claim 23, wherein the reference RF signal comprises a synchronization signal block (SSB).

25. The receiver device of claim 23, wherein the positioning reference RF signal comprises a positioning reference signal (PRS).

26. The receiver device of claim 23, wherein the receiver device comprises a user equipment (UE) and the transmission point comprises a base station.

27. The receiver device of claim 23, wherein the receiver device comprises a base station and the transmission point comprises a user equipment (UE).

28. A transmission point, comprising:
a memory; at least one transceiver; and at least one processor communicatively coupled to the memory and the at least one transceiver, the at least one processor configured to:
transmit, via the at least one transceiver, to a receiver device, a reference radio frequency (RF) signal;
transmit, via the at least one transceiver, to the receiver device, an indication that the reference RF signal is a source for one or more quasi-collocation (QCL) types for positioning reference RF signals transmitted to the receiver device by the transmission point; and
transmit, via the at least one transceiver, to the receiver device, a positioning reference RF signal, wherein the reference RF signal and the positioning reference RF signal have the same average delay, the same delay spread, or both the same average delay and the same delay spread based on the reference RF signal and the positioning reference RF signal having the one or more QCL types.

29. The transmission point of claim 28, wherein the receiver device comprises a user equipment (UE) and the transmission point comprises a base station.

30. The transmission point of claim 29, wherein the base station is a serving base station or a neighboring base station.

* * * * *